United States Patent Office 2,939,876
Patented June 7, 1960

2,939,876

PREPARATION OF ACID ANHYDRIDES

Friedrich D. Cramer, Heinrich Delpstrasse 226, Darmstadt-Eberstadt, and Klaus G. Gartner, % Dynamit A.G. Paul Mullerstrasse 19, Troisdorf, Rhineland, Germany No Drawing. Filed Apr. 27, 1959, Ser. No. 808,897

Claims priority, application Germany Oct. 28, 1958

16 Claims. (Cl. 260—461)

This invention relates to a method for the preparation of acid anhydrides, and it more particularly relates to an improved method for the preparation of acid anhydrides wherein at least one of the acid residues, or acyl groups, is derived from an acid of pentavalent phosphorus, such as a phosphoric acid, a phosphonic acid, a phosphinic acid or the thio analogs of one of such acids, the second acyl group being derived from the same or a different acid.

As is shown by such art as Whetstone, United States Patent No. 2,648,696, and Kosolapoff, United States Patent No. 2,486,658, acid anhydrides of phosphoric acids (i.e., "polyphosphates") and mixed acid anhydrides wherein at least one of the acyl groups is derived from a phosphoric acid or other acid of pentavalent phosphorus, are of substantial interest as insecticides. Those compounds also find use as additives for gasolines and other fuels for internal combustion engines, as additives for oils and greases, and as intermediates in organic syntheses.

We have found that anhydrides derived from a phosphoric acid and another acid can be prepared by the reaction of an acid with an alpha-alkoxy, beta-dihalovinyl diester phosphate, according to the general equation:

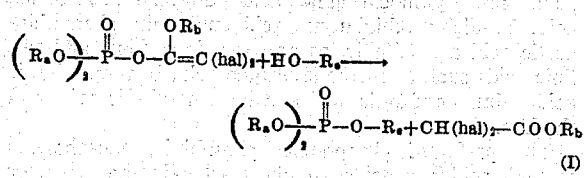

(I)

wherein hal is halogen, preferably chlorine or bromine, $R_a$ is alkyl or phenyl, $R_b$ is alkyl and $R_c$ is the residue of the acid, $HO-R_c$.

We have further found, however, that to obtain good yields of the anhydride by this process requires the use of the relatively high temperatures of 80° C. or above. Under such severe conditions, control of the reaction is very difficult and high conversion of the reactants to the desired products is obtained only with great difficulty, substantial amounts of resinous materials of no known value being formed if great care is not exercised.

We now have discovered that if a different kind of a substituted vinyl ester of an acid of pentavalent phosphorus is used as the starting material, all of the aforesaid difficulties are avoided, and the anhydrides can be prepared in high yields at low temperatures. By the use of this different kind of vinyl ester, the reaction is easily controlled and the formation of undesirable by-products is avoided with but ordinary care. In contrast to our earlier-discovered process, equal yields—in fact in many cases, substantially higher yields—of anhydrides are obtained at reaction temperatures of about 20–30° C. and reaction times of the order of one hour or less. Our new starting material is generically characterized as a neutral ester of an acid of pentavalent phosphorus wherein one of the ester groups is an alpha-alkoxy-beta-carboalkoxyvinyloxy group, and has the general formula:

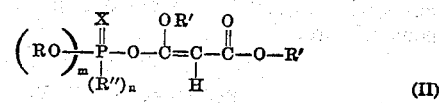

(II)

wherein R and R″ each represents an organic group, each R′ represents an alkyl group, X represents oxygen or sulfur, and each of the letters m and n is a whole number from 0 to 2 with the proviso that $m+n=2$. The phosphates—that is, the compounds of this structure wherein $m=2$, are preferred. The groups represented by R and R″ may be identical, they may be the same in character, or they may be different in character. Preferably each of the groups, R and R″, is a hydrocarbon group, and still more preferably contains not more than 20 carbon atoms. R and R″ thus each may represent an aliphatic hydrocarbon group, including straight-chain, branched-chain and cyclic aliphatic hydrocarbon groups, such as the straight-chain and branched-chain alkyl groups, the corresponding olefinically unsaturated groups such as the alkyl and alkadienyl groups, and the cyclic groups such as the cycloalkyl, cycloalkenyl and cycloalkadienyl groups, the hydrocarbon-substituted alkyl groups, and the like. Also, R and R″ each may represent an aromatic hydrocarbon group, including the unsubstituted aromatic hydrocarbon groups, and the aromatic hydrocarbon groups substituted by such hydrocarbon substituents as alkyl groups, alkenyl groups, cycloalkyl groups, aromatic groups, and the like. While the aromatic group or groups, R and R″, may be polynuclear, it is preferred that they be mononuclear, such groups as the phenyl group and alkyl-substituted phenyl groups being particularly preferred. It is preferred that the group or groups, R and R″, be free from acetylenic unsaturation. Exemplary of the suitable hydrocarbon group or groups, R and R″, are the various isomeric straight-chain and branched-chain alkyl groups of from 1 to 20 carbon atoms, alkenyl groups such as the vinyl, allyl and crotyl groups, alkadienyl groups such as the butadienyl and pentadienyl groups, cycloalkenyl groups such as the cyclobutenyl and cyclohexenyl groups, cycloalkadienyl groups, such as the cyclopentadienyl group, the phenyl group, alkyl-substituted phenyl groups such as the p-methylphenyl, p-ethylphenyl, 3,5-dimethylphenyl groups and the like, phenyl-substituted alkyl groups such as the benzyl group, the phenethyl group, the p-methylbenzyl group, and the like, and aralkenyl groups, such as the cinnamyl group, and the like. One or both of the groups, R and R″, may be substituted by such substituent groups as cyano, halogen, alkoxy, carboalkoxy, isocyano, nitro, sulfo or like groups, or it may contain such linking groups as the ether (—O—) linkage, ester (—O—OC—) linkage, mercapto (—S—) or keto (—CO—) linkage.

Also, when $m=2$, each of the symbols, R, may represent one of the free valence bonds of a divalent hydrocarbon radical. Thus, the two symbols, R, together, may represent a divalent hydrocarbon radical, such as an alkylene radical. Such an alkylene radical may be unsubstituted, or it may be substituted by one or more hydrocarbon substituent groups, such as alkyl, alkenyl, cycloalkyl, aryl, or like hydrocarbon groups. Preferably, such an alkylene radical contains not more than about 10 carbon atoms in the chain linking the two indicated oxygen atoms.

In Formula II, which generically describes the new reactants, the symbol R′, represents an alkyl group, preferably a lower alkyl group, such as an alkyl group of from 1 to 7 carbon atoms. Each of the alkyl groups, R′, may be the same, or each may be different. Each may be straight-chain, or branched-chain, or cyclic in configuration, and may be substituted by one or more hydrocarbon substituent groups. Preferably, each of the alkyl groups, R', are the same.

Typical and illustrative compounds of the new class of reactants are the following, the description being in terms of Formula III to avoid complicated and verbose nomenclature:

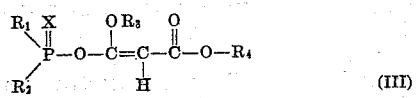

|   | R₁ | R₂ | R₃ | R₄ | X |
|---|---|---|---|---|---|
| 1 | Methoxy | methoxy | methyl | methyl | O |
| 2 | do | methyoxy | ethyl | ethyl | O |
| 3 | Methyl | ethyoxy | do | do | S |
| 4 | Ethyoxy | phenyoxy | do | do | O |
| 5 | Phenyoxy | do | methyl | do | O |
| 6 | Isopropoxy | isopropoxy | ethyl | do | O |
| 7 | Methyoxy | isobutoxy | n-propyl | n-propyl | S |
| 8 | Benzyloxy | methyl | isopropyl | isopropyl | O |
| 9 | do | benzoxy | ethyl | ethyl | S |
| 10 | Tolyl | methyl | do | do | O |
| 11 | Allyloxy | allyloxy | isobutyl | isobutyl | O |
| 12 | Cyclohexyloxy | cyclohexyl | methyl | methyl | S |
| 13 | Ethyl | ethyl | cyclohexyl | cyclohexyl | O |

Of particular value because of the ready availability of the raw materials from which it is prepared is alpha-ethoxy, beta-carbethoxyvinyl diethyl phosphate $$(R_1=R_2=R_3=R_4=\text{ethyl, } X=O).$$

These new starting materials are prepared according to the so-called Perkow reaction of a neutral ester of an acid of trivalent phosphorus wherein at least one of the ester groups is alkyloxy with a halogen-substituted diester of malonic acid, according to the equation:

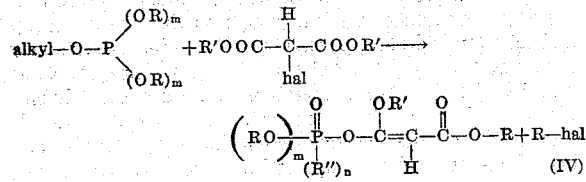

wherein hal=halogen, preferably bromine or chlorine, and the other symbols have their respective meanings set out herein.

This reaction, and the manner in which it is carried out, are set out generally in the articles by Perkow et al., 87, Chemische Berichte, 755 (1954), and 88, Chemische Berichte, 662 (1955), in U.S. Patent No. 2,765,331, and in detail in the article by Allen et al., 77, Journal of the American Chemical Society, 2871 (1955).

Our new process is effective for the preparation of the anhydride of any non-oxidizing acid, whether it be organic or inorganic. The anhydrides of acids which are organic in character are of most value. By "acids which are organic in character" is meant the usual organic acids and esters of inorganic acids wherein the ester group or groups are organic. Acids whose anhydrides can be prepared by our new process thus include, for example, mono- and poly-carboxylic acids. Suitably, the acids may be aliphatic, cycloaliphatic, aromatic, heterocyclic or mixed in character, and the aliphatic acids suitably are saturated or are olefinically unsaturated, but preferably are not acetylenically unsaturated. Sulfur acids, such as thiocarboxylic acids, sulfonic acids, sulfinic acids, sulfamic acids, and the like, phosphorus acids, such as phosphoric acid (including polyphosphoric acid), phosphorous acid, phosphonic acids, phosphinic acids, phosphonous acids and phosphinous acids, and the like are all suitable, as are the boron acids, including boric acid, boronic acids and borinic acids, arsenic acids, such as arsenous acid and arsenic acid, the hydrohalic acids, silicic acid, telluric acid and the like. Also, in the case of polybasic acids, the partial esters and/or salts also are suitable. Thus, for example, dialkyl acid phosphates, alkyl hydrogen alkylphosphonates, alkyl hydrogen alkylboronates and the like are all suitable. Where a partial ester is used, the esterifying group or groups preferably are hydrocarbon as represented by the symbol, R, of Formula II. Substituted acids also are suitable, typical substituents including such groups as the cyano, alkoxy, carboalkoxy, isocyano, ester, nitro, sulfo and amino groups, and the halogen atoms. The acids suitably may also contain ether (—O—) linkage, mercapto (—S—) linkage, keto (—CO—) linkage or ester (—O—CO—) linkage. Preferred acids for certain purposes are the alkane carboxylic acids, particularly the monocarboxylic acids, containing up to 18 carbon atoms, and including unsubstituted fatty acids, such as formic acid, acetic acid, propionic acid, butyric acid, valeric acid, caproic acid, capric acid, pelargonic acid, lauric acid, myristic acid, palmitic acid, stearic acid and their homologs and various branched-chain isomers and unsaturated acids such as oleic acid, linoleic acid, 2,4-pentadienoic acid, acrylic acid, methacrylic acid, crotonic acid, hydrosorbic acid, tetrolic acid and the like.

Examples of suitable aromatic acids include benzoic acid, toluic acid, naphthenic acid, cinnamic acid, biphenylacetic acid, p-chloroformylbenzoic acid, terephthalic acid, isophthalic acid, p-t-butylbenzoic acid, o-methyl, p-t-butylbenzoic acid, and p-octadecylbenzoic acid. Preferably, the aromatic acid contains no more than about 20 carbon atoms.

Other suitable acids include carbonic acid and functional derivatives of carbonic acid, such as carbamic acid, methylcarbamic acid, diethylcarbamic acid, ethylchloroformic acid, N-piperidinecarbonic acid, bis(1,3-dimethylbutyl)carbamic acid, diallylcarbamic acid, N-phenylmethylcarbamic acid and cyclohexylchloroformic acid; cycloaliphatic acids such as cyclopentanecarboxylic acid, cyclohexanecarboxylic acid and dimethylcyclopentanecarboxylic acid; polycarboxylic acids, such as 3-chloroformylpropionic acid, adipic acid, succinic acid, phthalic acid, tetrachloro-2,5-endomethylenetetrahydrophthalic acid and glutaric acid. Thionocarboxylic acids, such as thioacetic acid, thiopropionic acid, thiobutyric acid, thiobenzoic acid, dimethylthiocarbamic acid, dipropylthiocarbamic acid, 2,3-dichlorothiobutyric acid and p-nitrophenylthioacetic acid are suitable, as are organic sulfonic and sulfinic acids such as methanesulfonic acid, benzenesulfonic acid, 1-butanesulfonic acid and benzenesulfinic acid, and the like.

The preferred phosphonic, phosphinic, phosphonous and phosphinous acids are those wherein the group or groups directly bonded by carbon to the phosphorus atom are hydrocarbon groups as set out herein for the symbol, R, of Formula II. Likewise, the preferred boronic and borinic acids are those wherein the group or groups directly bonded by carbon to the boron atom are hydrocarbon.

Another class of acids whose anhydrides are of substantial interest is that class of acids commonly known as the amino acids, such as glycine, alanine, etc. Examples of the suitable amino acids are set out in Fieser and Fieser, "Organic Chemistry," Heath, 2nd edition, 1950, on pages 431 and 432 thereof, and for that reason will not be listed here.

Our new process also will form anhydrides of phenols, which, therefore, are "acids," within the meaning of that term as used herein. While mononuclear phenols and polynuclear phenols both are suitable, the products resulting from mononuclear phenols are usually preferred. Both monohydric and polyhydric phenols are suitable. Suitable phenols thus include phenol itself, the cresols, the mono- and poly-halophenols, the mono- and polynitrophenols, catechol, resorcinol, pyrogallol, phloroglucinol, the aminophenols, and the like.

According to our discovery, in any particular case, the desired anhydride is prepared by simply mixing the vinyl ester of the phosphorus acid and the acid reactant, and allowing the mixture to stand, either with or without mixing, at a temperature between about 0° C. and about 50° C. for a period of time sufficient to permit the desired reaction, then recovering the anhydride product from the reaction mixture. Preferably, substantially anhydrous reactants are used, and the reaction mixture is maintained as free from water as possible. In most cases, the only by-product is the malonic acid ester resulting from the reaction forming the anhydride. Recovery of the product anhydride is effected by the usual methods, conveniently by fractional distillation of the crude reaction mixture in a high vacuum.

In many cases, the reaction of the vinyl ester and the acid is conveniently carried out at about room temperature—that is to say, at temperatures of from about 15° C. to about 35° C.

In most cases, about the stoichiometric quantities of the reactants are used. That is, usually about one mole (or equivalent) of the acid is used per mole of the vinyl ester. However, a moderate excess—up to about 100% excess—of either of the reactants—may be used to advantage in some cases to insure completion of the reaction.

The reaction can be conducted at any pressure which is convenient for operation. In most cases, operation at substantially atmospheric pressure will be found to be most convenient.

Water preferably is excluded from the reaction zone, since the product anhydride may in some cases be reactive with water.

In some cases, it may be found desirable to use a solvent for the reactants. Any liquid which is inert with respect to the various components of the reaction mixture and which is a good solvent for the reactants and products of the reaction will be suitable. Benzene or other aromatic solvent often is a useful and convenient solvent.

The reaction of the vinyl ester with the acid ordinarily is substantially completed within a short time—in a matter of one to two hours or less. In many cases, however, it may be found desirable to maintain the reaction mixture for a substantially longer period of time to insure that the reaction will proceed as far as possible.

The foregoing constitutes the general description of our new process. Performance of that process in particular cases is shown in the following examples. It is to be understood that these examples are set out only for the purpose of illustrating the process of the invention, and are not included, and are not to be construed, as limiting the invention in any way not recited in our claims.

In these examples, "parts" means parts by weight unless otherwise specifically indicated.

EXAMPLE I

A mixture of phosphoric acid-($\alpha$-ethoxy-$\beta$-carbethoxy-vinyl ester)-diethyl ester (I) with the acids referred to in the following Table I was stored at 37°, the mixture of I with diethyl phosphate being kept at room temperature.

The reaction mixture was then distilled in a high vacuum. The following results were obtained.

Table I

| Starting Material, parts | | Reaction Products: Acylphosphoric Acid Diethyl Ester | | | | | | | |
|---|---|---|---|---|---|---|---|---|---|
| | | Yield | | | | Analysis | | | |
| I | Acid | Parts | Percent of Theory | Boiling Point | $n_D^{25}$ | Empirical Formula | Molecular Weight | Percent P | |
| | | | | | | | | Calculated | Found |
| 8 | 1.62 Acetic acid | 2 | 38 | 70°/0.2 | 1.4115 | $C_6H_{13}O_5P$ | 196.1 | 15.75 | 15.11 |
| 8 | 2 Propionic acid | 7 | 63 | 68°/0.05 | 1.4140 | $C_7H_{15}O_5P$ | 210.2 | 14.74 | 14.15 |
| 14 | 4.5 Butyric acid | 6.8 | 64 | 76–77°/0.03 | 1.4172 | $C_8H_{17}O_5P$ | 224.2 | 13.76 | 13.33 |
| 12 | 4.5 Valeric acid | 6.35 | 66 | 79°/0.05 | 1.4186 | $C_9H_{19}O_5P$ | 238.1 | 13.01 | 13.44 |
| 13 | 5.5 Caproic acid | 7.1 | 66.5 | 82–84°/0.01 | 1.4202 | $C_{10}H_{21}O_5P$ | 252.1 | 12.30 | 12.77 |
| 10.5 | 4.35 Benzoic acid | 5 | 55 | 110–111°/0.01 | 1.4922 | $C_{11}H_{15}O_5P$ | 258.2 | 12.04 | 12.49 |
| 10 | 4.7 p-Nitrophenol | 6.8 | 71 | 139–140°/0.05 | 1.5088 | $C_{10}H_{14}NO_6P$ | 275.2 | 11.25 | 10.36 |
| 11.6 | 6 Diethyl phosphate | 9.6 | 85 | 105–106°/0.05 | 1.4173 | | | | |

EXAMPLE II 0.75 part of phosphoric acid-($\alpha$-ethoxy-$\beta$-carbethoxy vinyl ester)-diethyl ester was combined with 0.35 part of cinnamic acid and stored in an incubator. After distilling in a high vacuum the mixed acid anhydride of diethyl phosphate and cinnamic acid were obtained in a yield which was 63% of theory.

EXAMPLE III 1.16 parts of p-toluenesulfonic acid were mixed with 2 parts of phosphoric acid-($\alpha$-ethoxy-$\beta$-carbethoxy vinyl ester)-diethyl ester. The reaction was exothermic and after a few minutes the acid was dissolved. After storing at room temperature the reaction mixture was separated by distillation in high vacuum. The mixed acid anhydride of diethyl phosphate and p-toluene sulfonic acid was obtained in a yield of 87% of theory.

EXAMPLE IV 4.5 parts of phosphoric acid-($\alpha$-ethoxy-$\beta$-carbethoxy vinyl ester)-diethyl ester were combined with 3.8 parts of phosphoric acid diphenyl ester and stored at room temperature. After distilling in high vacuum the mixed acid anhydride of diethyl phosphate and diphenyl phosphate was separated off. The yield was 60% of theory.

EXAMPLE V

Phosphoric acid-($\alpha$-ethoxy-$\beta$-carbethoxy vinyl ester)-diethyl ester was converted with carbo benzoxyglycine according to the following reaction scheme:

$$(H_5C_2O)_2\underset{\underset{O}{\|}}{P}-O-C(OC_2H_5)=CH-COC_2H_5+CbONHCH_2COOH \rightarrow$$

$$CbONHCH_2\underset{\underset{O}{\|}}{C}-O-\underset{\underset{O}{\|}}{P}(OC_2H_5)_2 + \text{diethyl malonic ester}$$

The reaction is carried out in dry acetone and dioxane at 35° C. In both cases the yield was about 80% of theory.

EXAMPLE VI

In a series of comparative experiments mixed acid anhydrides of acid phosphoric acid esters and other acids were produced by means of phosphoric acid ($\alpha$-ethoxy-$\beta$,$\beta$-dichlorovinyl ester)-diethyl ester (II).

The results obtained are listed in the following Table II.

Table II

| Starting Material, grams | | Reaction Conditions | | Yield, Percent of Theory |
|---|---|---|---|---|
| II | Acid | Hours | °C. | |
| 19 | 10 diethyl phosphate phosphate | 8 | 80 | 30 |
| 6 | 2.5 benzoic acid | 16 | 100 | 40 |
| 6 | 5.14 diphenyl phosphate | 2.5 | 80 | 42 |

The results show that with II, despite the rigorous reaction conditions, yields are obtained which are lower than those obtained with the phosphoric acid vinyl ester to be used according to the invention.

We claim as our invention:

1. A process for the preparation of an acid anhydride of a neutral ester of an acid of pentavalent phosphorus, which process comprises bringing into contact with each other a non-oxidizing acid and a neutral ester of an acid of pentavalent phosphorus wherein at least one ester group is an alpha-alkoxy, beta-carboalkoxyvinyloxy group, neither reactant containing any acetylenic unsaturation.

2. A process for the preparation of an acid anhydride of a neutral ester of an acid of pentavalent phosphorus, which process comprises bringing into contact with each other a non-oxidizing carboxylic acid and a neutral ester of an acid of pentavalent phosphorus wherein at least one ester group is an alpha-alkoxy, beta-carboalkoxyvinyloxy group, neither reactant containing any acetylenic unsaturation.

3. A process for the preparation of an acid anhydride of a neutral ester of an acid of pentavalent phosphorus, which process comprises bringing into contact with each other a non-oxidizing amino acid and a neutral ester of an acid of pentavalent phosphorus wherein at least one ester group is an alpha-alkoxy, beta-carboalkoxyvinyloxy group, neither reactant containing any acetylenic unsaturation.

4. A process for the preparation of an acid anhydride of a neutral ester of an acid of pentavalent phosphorus, which process comprises bringing into contact with each other a non-oxidizing partial ester of an acid of pentavalent phosphorus and a neutral ester of an acid of pentavalent phosphorus wherein at least one ester group is an alpha-alkoxy, beta-carboalkoxyvinyloxy group, neither reactant containing any acetylenic unsaturation.

5. A process for the preparation of an acid anhydride of a neutral ester of an acid of pentavalent phosphorus, which process comprises bringing into contact with each other a non-oxidizing sulfonic acid and a neutral ester of an acid of pentavalent phosphorus wherein at least one ester group is an alpha-alkoxy, beta-carboalkoxyvinyloxy group, neither reactant containing any acetylenic unsaturation.

6. A process for the preparation of an acid anhydride of a neutral ester of an acid of pentavalent phosphorus, which process comprises bringing into contact with each other a non-oxidizing acid and a neutral ester of an acid of pentavalent phosphorus of the formula:

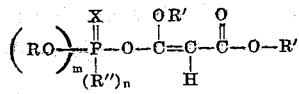

wherein R and R'' each singly represents a monovalent hydrocarbon group of up to 20 carbon atoms, each R' represents an alkyl group of up to 7 carbon atoms, X represents a member of the group consisting of oxygen and sulfur, and the letters $m$ and $n$ each represents a whole number from 0 to 2, with the proviso that $m+n=2$, and with the further proviso that when $m=2$, each of R, singly, represents a monovalent hydrocarbon group as above, and both of R together represent an alkylene group, neither reactant containing any acetylenic unsaturation.

7. A process for the preparation of an acid anhydride of a neutral ester of an acid of pentavalent phosphorus, which process comprises bringing into contact with each other a non-oxidizing carboxylic acid and a neutral ester of an acid of pentavalent phosphorus of the formula:

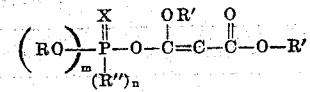

wherein R and R'' each singly represents a monovalent hydrocarbon group of up to 20 carbon atoms, each R' represents an alkyl group of up to 7 carbon atoms, X represents a member of the group consisting of oxygen and sulfur, and the letters $m$ and $n$ each represents a whole number from 0 to 2, with the proviso that $m+n=2$, and with the further proviso that when $m=2$, each of R, singly, represents a monovalent hydrocarbon group as above, and both of R together represent an alkylene group, neither reactant containing any acetylenic unsaturation.

8. A process for the preparation of an acid anhydride of a neutral ester of phosphoric acid, which process comprises bringing into contact with each other a non-oxidizing acid and a neutral ester of phosphoric acid wherein at least one ester group is an alpha-alkoxy, beta-carboalkoxyvinyloxy group, neither reactant containing any acetylenic unsaturation.

9. A process for the preparation of an acid anhydride of a neutral ester of phosphoric acid, which process comprises bringing into contact with each a non-oxidizing carboxylic acid and a neutral ester of phosphoric acid wherein at least one ester group is an alpha-alkoxy, beta-carboalkoxyvinyloxy group, neither reactant containing any acetylenic unsaturation.

10. A process for the preparation of an acid anhydride of a neutral ester of phosphoric acid, which process comprises bringing into contact with each other a non-oxidizing acid and a neutral ester of phosphoric acid of the formula:

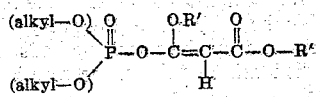

wherein "alkyl" represents an alkyl group of up to 20 carbon atoms and each of R' represent the same alkyl group of up to 7 carbon atoms, neither reactant containing any acetylenic unsaturation.

11. A process for the preparation of an acid anhydride of a neutral ester of phosphoric acid, which process comprises bringing into contact with each other a non-oxidizing carboxylic acid and a neutral ester of phosphoric acid of the formula:

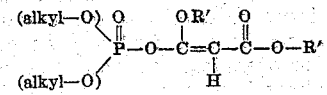

wherein "alkyl" represents an alkyl group of up to 20 carbon atoms and each of R' represent the same alkyl group of up to 7 carbon atoms, neither reactant containing any acetylenic unsaturation.

12. A process for the preparation of an acid anhydride of a neutral ester of an acid of pentavalent phosphorus, which process comprises bringing into contact with each other a non-oxidizing acid containing no acetylenic unsaturation and alpha-ethoxy-beta-carboethoxyvinyl diethyl phosphate.

13. A process for the preparation of an acid anhydride of a neutral ester of an acid of pentavalent phosphorus, which process comprises bringing into contact with each other a non-oxidizing carboxylic acid containing no acetylenic unsaturation and alpha-ethoxy-beta-carboethoxyvinyl diethyl phosphate.

14. A process for the preparation of an acid anhydride of a neutral ester of phosphoric acid, which process comprises bringing into contact with each other a non-oxidizing acid of the formula: R—COOH, where R is a hydrocarbon radical of up to 20 carbon atoms selected from the group consisting of alkyl and aryl hydrocarbons containing no acetylenic unsaturation, and a neutral ester of phosphoric acid of the formula:

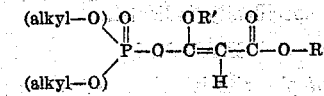

wherein "alkyl" represents an alkyl group of up to 20 carbon atoms and each R' represents an alkyl group of up to 7 carbon atoms.

15. A process for the preparation of an acid anhydride of a neutral ester of an acid of pentavalent phosphorus, which process comprises bringing into contact with each other a non-oxidizing acid of the formula: alkyl-COOH, where alkyl represents an alkyl group of up to 20 carbon atoms and contains no acetylenic unsaturation and alpha-ethoxy-beta-carboethoxyvinyl diethyl phosphate.

16. A process for the preparation of an acid anhydride of a neutral ester of an acid of pentavalent phosphorus, which process comprises bringing into contact with each other cinnamic acid and alpha-ethoxy-beta-carboethoxyvinyl diethyl phosphate.

No references cited.